April 10, 1973 R. F. SHANNON 3,726,755

HIGH-STRENGTH FOAM MATERIAL

Original Filed Sept. 29, 1966 2 Sheets-Sheet 1

INVENTOR.
RICHARD F. SHANNON
BY
*Stalker & Overman*
ATTORNEYS

United States Patent Office 3,726,755
Patented Apr. 10, 1973

3,726,755
HIGH-STRENGTH FOAM MATERIAL
Richard F. Shannon, Lancaster, Ohio, assignor to
Owens-Corning Fiberglas Corporation
Division of application Ser. No. 582,903, Sept. 29, 1966, now Patent No. 3,562,370, which is a continuation-in-part of application Ser. No. 378,216, June 26, 1964, which in turn is a continuation-in-part of application Ser. No. 132,827, Aug. 21, 1961, both now abandoned. This application Sept. 25, 1970, Ser. No. 75,655
The portion of the term of the patent subsequent to June 13, 1984, has been disclaimed and dedicated to the Public
Int. Cl. B32b 5/18; C03c 11/00, 17/32
U.S. Cl. 161—168
8 Claims

ABSTRACT OF THE DISCLOSURE

A body of foam that has high compressive strength along at least one of its major axes. The foam body contains glass foam pellets and a matrix of a foamed binder. The pellets are arranged in end to end, substantial abutting engagement along at least one major axis of the foam body. The matrix of a foamed binder fills the interstices between the glass foam pellets.

---

This application is a division of copending application Ser. No. 582,903, filed Sept. 29, 1966, now U.S. Pat. No. 3,562,370, which in turn is a continuation-in-part of application Ser. No. 378,216, filed June 26, 1964, and now abandoned and which in turn is a continuation-in-part of application Ser. No. 132,827, filed Aug. 21, 1961, and now abandoned.

This invention relates to a composite cellular article, comprising pellets of foamed glass and a foamed organic or inorganic binder and wherein the foamed glass pellets are in generally abutting relationship in at least one of three mutually perpendicular planes; and particularly to an insulation material of this type having high compressive strength.

Foamed glass insulation produced heretofore has been considerably heavier than competing materials and in addition is extremely susceptible to both thermal shock and mechanical shock and shatters into many pieces when struck or subjected to bending forces, particularly when the insulation is in thin sections. Normally, glass foam does not have as low a thermal conductivity as do organic foams. In addition, it will not withstand the forces involved in the treatment normally given insulation materials during manufacturing and assembling operations, and therefore glass foams have not been acceptable heretofore except in very limited applications.

It would appear that satisfactory materials might be produced using pieces of foamed glass as a light weight aggregate dispersed throughout a suitable binder. In such structures, binders completely surround the aggregate and occupy such a high percentage by volume of the material that the composite material is too heavy and too expensive for use as an insulation material. If the weight of these binders is reduced to an amount where the amount of binder used would make the composite economically competitive, the binder is only present in an amount to act as an adhesive for attaching the particles of the foamed glass together, and does not fill all of the interstitial voids between the particles of foamed glass. In such a structure, the stress concentration at the point of attachment of one particle of foamed glass to another is so large that the composite does not have the requisite strength required of a commercial insulation material.

Composites in which particles of foamed glass are supported in a matrix of an organic foam have a low coefficient of thermal conductivity, but the properties thereof are largely determined by those of the matrix and not by the foamed glass. The properties thereof are so nearly like those of the organic foam that no appreciable advantage over the pure organic foam is had by the incorporation of the foamed glass particles, and the addition of the foamed glass particles will usually amount to an added expense and weight that is not justified. One deficiency, for example, of an organic foam, such as foamed polystyrene, is that its compressive strength is low and that it is permanently deformed by relatively low compressive loads. Foamed glass particles dispersed throughout a matrix of foamed polystyrene does not appreciably improve properties of the foamed polystyrene.

An object of the present invention is the provision of a new and improved composite structure comprising foamed glass pellets in a binder of foam, and which composite has light weight, is strong, has a low coefficient of thermal conductivity, and has properties more nearly that of the foamed glass than of the binder.

Another object of the invention is the provision of a new and improved insulation material which will withstand the normal treatment given insulation materials, and which is capable of withstanding relatively high compressive loads, so that it is capable of being used in load bearing structures, as for example, in the floors of walk in type refrigerators and cold storage plants.

Another object of the invention is the provision of a new and improved method of producing foamed material from organic polymers which are capable of withstanding high compressive loads without materially increasing the density above that of the organic foam itself.

Other objects and advantages will be apparent from the description which follows, reference being made to the accompanied drawings, and in which.

As previously indicated, the present invention involves a composite of particles of foamed glass and foamed organic resin arranged in a particular manner to give the composite properties which are more than a weighted proportion of properties of the two materials. In order that this can be fully appreciated, the structure and method of making the foamed glass used in the composite will first be described.

Figure 1:
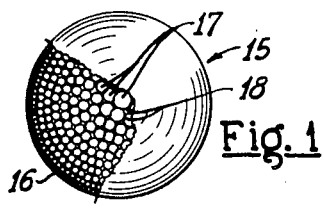
FIG. 1 is an idealized plan view of a glass foam pellet having a substantially continuous, impervious exterior region, with a portion of the pellet broken away to show details of the structure.

Referring now in more detail to the drawings and, in particular to FIG. 1, a pellet which is particularly useful in producing articles according to the invention is designated generally at 15. The pellet 15 comprises a substantially continuous, impervious skin 16 and a plurality of cells 17, each of which is defined by a thin wall 18 of the same material as the skin 16.

Figure 2:
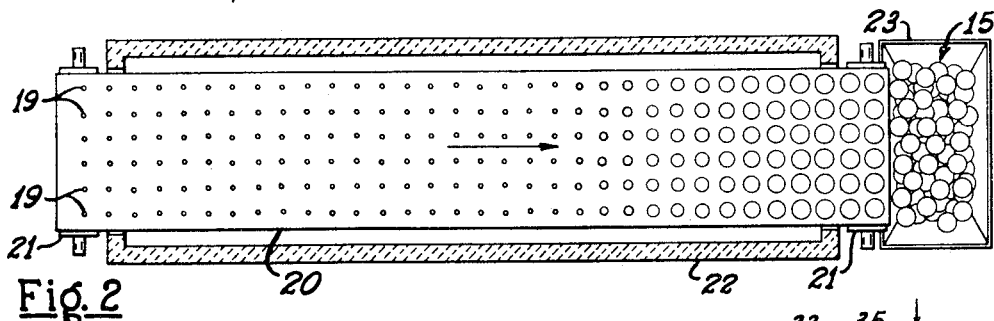
FIG. 2 is a plan view, with parts broken away to show details of construction, of a furnace in which the pellets of FIG. 1 can be produced.

The pellet 15 can conveniently be produced by depositing foamable bodies 19 on a conveyor belt 20 carried by rolls 21, one of which is driven in any suitable manner (not illustrated) to advance the belt 20 in the direction indicated by the arrow in FIG. 2. The foamable bodies 19 are advanced by the belt 20 into a furnace enclosed by walls 22, and heated in any suitable manner (not illustrated) to cause drying of the foamable bodies 19, followed by cellulation, and the formation of the substantially continuous noncellular skin. The pellets 15 are then discharged from the right-hand end of the belt 20 into a hopper 23.

It will be noted in FIG. 1 that the cells 17 in the interior of the pellet 15 are shown as larger in size than those adjacent the skin 16. This is caused by the disruption of the cells in the exterior portion of the pellet while the sidewalls of the cells are still molten to produce the pellet 15 as described above. It will be appreciated that such heating must be to a temperature sufficiently high to cause at least incipient fusion of the surface portion, so that reforming of bursted cell walls into a substantially noncellular skin is accomplished. It will also be noted that the pellet 15 is represented as being regular in configuration, and spherical in overall shape. This is not necessarily the situation and, in fact, would seldom occur in actual practice, since the heating to cause foaming of the bodies 19 in the furnace of FIG. 2, for example, is not to a temperature sufficiently high for surface tension to cause contraction to the minimum volume spherical shape, and, additionally, because the bodies are not free floating during this heating. In fact, it is often desirable to deform the pellets to provide particular required shapes. The walls 18 are also represented as being continuous. This is highly advantageous in some situations, e.g., when the pellets are to be used in making thermal insulating structures. However, broken walls 18 are advantageous in other situations, e.g., when the pellets are to be used in acoustical insulating structures. Both types of pellets can be provided, and are contemplated hereby.

Figure 3:
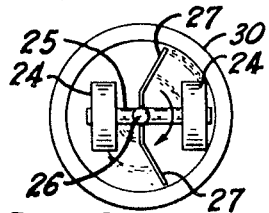
FIG. 3 is a plan view of a muller which can be used to produce pellets which constitute a charging material for the furnace of FIG. 2.
Figure 4:
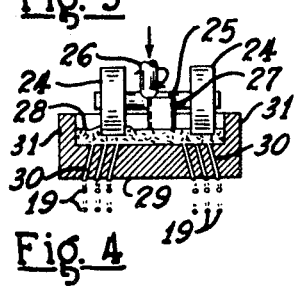
FIG. 4 is a vertical sectional view of the muller of FIG. 3.

The foamable bodies 19 can conveniently be prepared in apparatus which is shown in FIGS. 3 and 4, and which comprises two wheel members 24, each of which is journaled to a shaft 25, which is carried by a drive shaft 26 mounted in any suitable mannner (not illustrated) for rotation in the directions indicated by the arrows in FIGS. 3 and 4. A scraper blade 27 is welded or otherwise rigidly attached to the shaft 25 for rotation therewith. A foamable composition 28 is carried by a plate member 29 through which orifices 30 are provided, and which has integral, upwardly extending side walls 31 to confine the foamable material 28 laterally. As the drive shaft 26 is rotated it is also urged downwardly in the direction of the arrow in FIG. 4 so that it causes working of the foamable composition on the plate member 29 and through the orifices 30 so that foamable bodies 19 are extruded from the orifices 30. Other types of available pelletizing apparatus can also be used to produce the bodies 19.

The foamable composition 28 in the apparatus of FIGS. 3 and 4 can conveniently consist of 100 parts[1] of glass A,[2] 0.5 part of aluminum flake, 1.5 parts of anhydrous calcium sulfate and 1.5 parts of barium sulfate. All of the constituents of the foamable composition are in a powdered form, all finer than about 50 mesh, U.S. Sieve Series, and substantially all being finer than 200 mesh, the aluminum flake being minus 325 mesh in its entirety. It will be noted that this composition is principally glass. This is an important consideration, because the glass is of uniform, consistent quality, so that the bodies 15 (FIG. 1) which are produced therefrom are also of uniform, consistent quality. It has been found that cellular glass pellets are unexpectedly effective, by comparison with previously known pellets, at improving the thermal insulating properties of binders with which they are used. The fineness of the cells of the glass foam pellets is an important factor in achieving the improved properties. It will be appreciated that the calcium sulfate and the barium sulfate are used merely as blowing agents, and are useful because they release gases at a temperature range in which the particular glass identified above has viscosity characteristics suitable for cellulation or foaming. The aluminum flake apparently acts as a nucleating agent. Very fine powders of other materials which do not melt at the softening temperature of the glass, can also be used as nucleating agents. Suitable examples are —325 mesh powders of titanium dioxide, zircon and chromium oxide. The fine particles of nonmelting material act as seeds about which the blowing gases accumulate to produce an extremely large number of small gas bubbles. It will also be appreciated that various other glasses could be used in place of glass A, and with the same blowing agents if those glasses have the same high temperature viscosity characteristics as glass A, or with a different blowing agent composition if, as is more likely to be the situation, the high temperature viscosity characteristics are significantly different. In this instance, as is true in the formulation presented above, the blowing agent or blowing agent composition would be required to be one which released gases over a temperature range at which the glass had the required viscosity characteristics. For example, foams have been produced from finely ground soda lime glass and 1/10 percent of 1000 mesh silicon carbide plus 3/4 percent of sodium carbonate, and it is believed that increasing the percentages of both the silicon carbide and the sodium carbonate by as much as 50 percent would improve the properties of the pellets. Pellets 15 can be produced from the foamable composition identified above, in the apparatus of FIG. 2, by controlling the heating of the furnace defined by the walls 22 and the drive rate of the belt 20 so that the foamable bodies 19 are heated to about 1900° F. during passage through the furnace. The glass pellets which are produced using a sulfate salt as a blowing agent are filled with sulfur dioxide gas which is objectionable in some instances. The odor of the pellets can be reduced by treating the pellets with a resin containing activated carbon. In some instances the sulfur dioxide gas in the pellets may cause a corrosion problem and this can be greatly reduced by coating the pellets with paraffin wax. It has also been found that the pellets can be made stronger, and less pervious to water by coating with a resin containing a silicone. With some compositions of glass, it is possible to use powdered zinc or metallic mercury as a blowing agent. The glasses which

---

[1] The terms "percent" and "parts" are used herein and in the appended claims to refer to percent and parts by weight, unless otherwise indicated.

[2] Glass A has substantially the following chemical analysis, in percent:

| | |
|---|---|
| $SiO_2$ | 54.6 |
| $Al_2O$ | 14.3 |
| $CaO$ | 17.4 |
| $MgO$ | 4.8 |
| $B_2O_3$ | 7.5 | and less than 1/2 percent of each of the following: $F_2$; $R_2O$ ($Na_2O$, $K_2O$); $Fe_2O_3$; $TiO_2$; $ZnO$.

are used with these metallic blowing agents must have softening points below the vaporization point of the metal. Mixtures of the powdered glass and metal are heated together to cause a softening of the glass; a subsequent increase in temperature then causes the metals to vaporize to cause a foaming of the glass.

In some instances, it may be desirable to improve the heat resistance of the foamed glass pellets that are produced by any of the above-suggested methods. This can be done by reheating the glass foam pellets to cause a partial recrystallization, or devitrification. The devitrification process can be aided by adding at least one metal oxide such as $TiO_2$ directly to the mixture used to produce the cellular pellets. The metal oxides can also be applied by spraying the pellets with a water solution of the metal oxides and then refiring. In some instances, it may be desirable to produce glass pellets having a surface that is high in silica. This can be accomplished by treating the pellets made from a leachable glass with hydrochloric acid to leach out the alkali materials of the glass. The foamed glass bodies can be produced in a manner different from that described above.

For example, the previously identified foamable composition can merely be introduced into a graphite mold, fired to about 1950° F. for about 12 minutes and then cooled in ambient air. A mold 12 inches by 18 inches by 3 inches deep with lips at its edges has been used satisfactorily with a layer of the foamable composition about 3/16 inch thick. After firing as indicated a massive product ranging from about 2 inches to about 3 inches in thickness has been produced. The resulting product is extremely fragile, and ordinarily will crack spontaneously during cooling, even if it is not handled. This massive, fragile foam body is then broken up, and particles of a desired size range which result are selected, and can be used in lieu of the pellets 15 in carrying out the processing steps discussed above in conjunction with FIGS. 5 and 6. The heating cycle to which reference is made in such discussion will cause sufficient fusion of the glass foam fragments to provide a substantially continuous, impervious skin, and also to enable adhesion of the individual fragments into a unitary structure. Such structure will have a somewhat higher density than that described above, will have a slightly less regular cell structure, and will be slightly less effective as a thermal insulating material, but will be otherwise substantially identical.

According to the present invention, the above described pellets are mixed with a foam, or a foamable material, and the mixture is pressed together and held in this condition while the organic foamable material is expanded or the foam is cured. The amount of foamed or foamable material and the manner in which the operation is carried out is such that the glass pellets are held into engagement with each other, at least along one major axis of the composite material. Where the amount of the foam material when in an expanded condition, produces a volume which is not greater than the interstitial volume of a void between the foamed glass pellets, the resulting material will withstand compressive forces along each of the three major axes of the composite. The foam forms a network in the interstitial voids which bonds the glass pellets together into a unitary structure which can be handled in the same manner as commercial insulation materials. Inasmuch as the pellets are not connected by fused glass, the structure does not fracture and break apart as does monolithic foamed glass when subject to shock, and because the pellets are in engagement with each other, the structure will take large compressive load when applied in any direction. This structure is shown in FIG. 9, and can be made by mixing any type of organic or inorganic foam with the glass pellets or by mixing a foamable organic or inorganic material with the pellets and foaming the material in situ.

Figure 5:
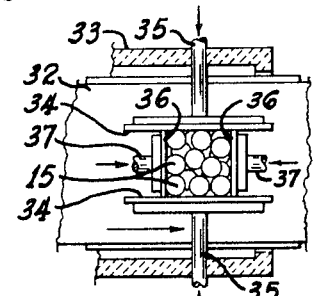
FIG. 5 is a fragmentary view in horizontal section showing continuous apparatus for the production of a structure which constitutes a plurality of cellular bodies each of which is enclosed within a substantially continuous, impervious skin that is continuous from cellular mass to cellular mass in some portions of the structure, and discontinuous in others.
Figure 6:
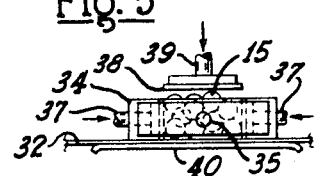
FIG. 6 is a partially schematic vertical sectional view of the apparatus of FIG. 5.
Figure 7:
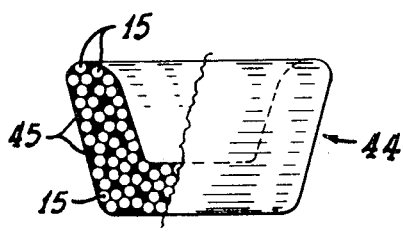
FIG. 7 is a view in elevation, with a part broken away to show details of the structure, of an article wherein glass pellets each having a substantially continuous, impervious skin are bonded relative to one another by a suitable binder composition.
Figure 8:
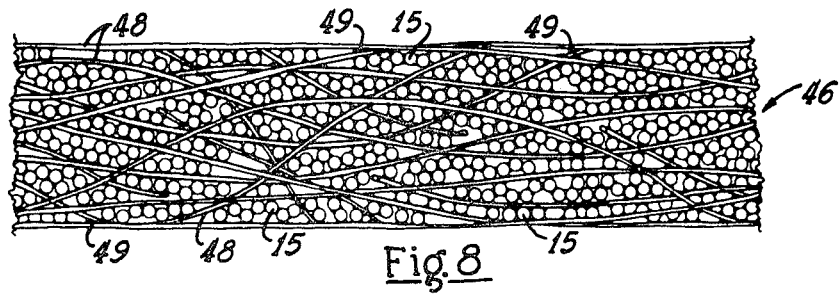
FIG. 8 is a fragmentary view in elevation of an article comprising pellets similar to those of FIG. 9, a relatively minor proportion of a binder composition, and fibers.
Figure 9:
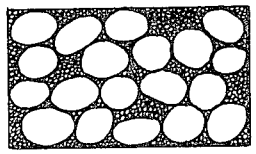
FIG. 9 is a sectional view through one embodiment of the invention.

The structure shown in FIG. 9 can be produced by the apparatus shown in FIGS. 5 and 6. The apparatus of FIGS. 5 and 6 comprises a continuous belt conveyor 32 which is supported in any suitable manner (not illustrated) for movement in the direction of the arrow of FIG. 5 through a furnace or oven defined by walls 33. A mixture of the pellets and beads is confined between pairs of side platens 34 and 36 that are supported by the rods 35 and 37 respectively so that they can be positioned to make blocks of finished materials of different lengths. The platens 34 and 36 confine the mixture laterally, and an upper platen 38 carried by shaft 39 is then moved downwardly in the direction of the arrow shown in FIG. 6 to compress the pellets. The pellets 15 are compressed until they touch each other, and the foamed or foamable binder is moved to the interstices between the pellets 15. A support 40 is provided immediately below the belt 32 in the region where this compression occurs. After the pellets 15 have been moved into engagement with each other, the matrix material if not already foamed is foamed to fill the interstices and produce the structure of FIG. 9.

When a higher percentage of the foam material is desired than that which just fills the interstitial voids of the pellets when held together, it is possible to hold the pellets in engagement between two opposing surfaces while permitting some movement in the directions parallel to these surfaces. When a mixture of pellets and foamable material is foamed while so held, columns of the pellets remain in abutting engagement between the two opposing surfaces, while the foamable material positioned between these columns of pellets, expands in the unconfined direction to provide a structure generally indicated in FIG. 11.

EXAMPLE 1

Figure 11:
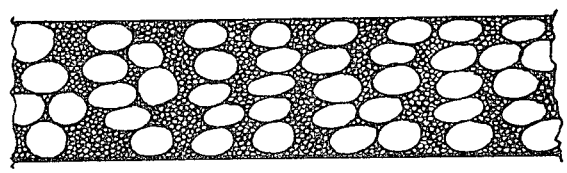
FIG. 11 is a fragmentary sectional view through material made by the apparatus shown in FIG. 10.

The structure shown in FIG. 11 can be produced by the apparatus shown in FIGS. 5 and 6. By way of example, a mixture of the pellets 15 and partially foamed polystyrene beads comprising approximately 20% by weight of the mixture are wetted and fed between the platens 34 and 36. The platens are heated to a temperature of approximately 350° F. and the upper platen 38 is brought down upon the top of the mixture so that it is confined between the platens above described and held down upon the conveyor 20. The force applied to the platen 38 by the shaft 39 is sufficient to hold the pellets 15 in touching engagement with each other. After the partially foamed polystyrene reaches a temperature of approximately 200° F., they, of course, start to expand. All force on the shaft 39 is removed at this time, so that essentially only the weight of the upper platen 38 is maintained on the mixture. Because the upper platen is free to move while the platens 34 and 36 are held fixed, the foamed polystyrene after filling the voids between the pellets expands upwardly to lift pellets positioned outwardly of the polystyrene being expanded. Because the pellets arrange themselves generally in layers spaced generally parallel to the conveyor belt 32, the layers of pellets above the layer which rests upon the belt 32 are raised by distances generally proportional to their original position from the belt 32, to provide the structure shown in FIG. 11. It will be appreciated that the structure shown in FIG. 11 is rotated 90° from the orientation as produced in FIG. 6.

Figure 10:
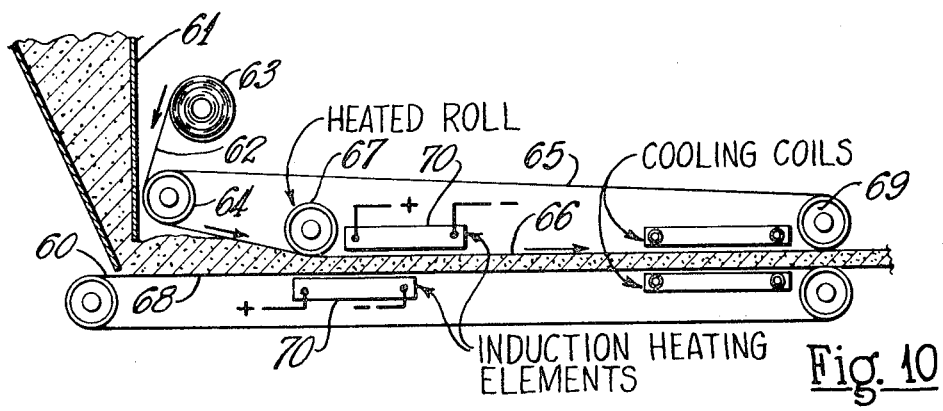
FIG. 10 is an elevational view of apparatus for making another embodiment of the invention.

Such a structure is also conveniently produced by the apparatus shown in FIG. 10, wherein a mixture of partially foamed styrene beads and glass pellets are fed to the top of an endless conveyor belt 60 from a hopper 61. A sheet of paper 62 uncoiled from a roll 63 is fed around the head pulley 64 of an endless conveyor belt 65 and is caused to parallel the bottom flight 66 of the conveyor belt 65. The lower flight 66 of the conveyor 65 has a heated idler roll 67 positioned the same distance from the top flight 68 of the lower conveyor 60 as is the tail pulley 69, so that the flights 66 and 68 are parallel. The portion of the lower flight 66 between the head pulley 64 and larger pulley 67 converges at a slight angle relative to the top flight 69, so that the mixture of prefoamed polystyrene pellets and glass pellets are compressed prior to the time that the conveyor reaches the heated idler roll 67. The angle of convergence of flights 66 and 68 is such that it squeezes the partially foamed polystyrene pellets from between the glass beads to cause them to fill the interstitial voids between the glass pellets prior to the time that they pass beneath the heaed roll 67. Upon reaching the heated roll 67, and while the pellets are held compressed against each other, the polystyrene beads are heated by heat flowing from the induction heating element 70. This causes the partially foamed polystyrene beads to expand, and since the glass pellets are confined vertically, the polystyrene is only free to grow laterally. It will be seen that the material passing on down the conveyor from the induction heating elements 70 will cool and rigidify, so that the polystyrene expands principally in the direction of the feed hopper 61, and that this expansion will generally be uniform throughout the thickness of the material. This expansion, therefore, displaces abutting columns of the glass beads towards the feed end of the conveyor system. This method of producing the composites, therefore, generally holds the pellets in abutting engagement in one direction while allowing the polystyrene to move columns thereof apart from each other in a direction perpendicular thereto. Once the polystyrene has cooled, it cements and holds the pellets in their aligned position, so that the resulting material can take large compressive loads applied between its top and bottom major surfaces. The material can comprise a high percentage of foamed polystyrene and still be able to support high compressive loads so long as columns of abutting glass beads remain.

EXAMPLE 2

A 12" x 12" x 2" composite was made by tumbling 68 grams of a foamable resin mix, later to be described, with 515 grams of ⅛ inch nominal diameter glass foam pellets having a true density of 10 pounds per cubic foot and a bulk density of 6.8 pounds per cubic foot. These pellets have interstitial voids of 32 percent. The tumbling procedure coated the pellets with the resin and thereafter the resin was placed in the apparatus shown in FIGS. 5 and 6 with the platens 34 and 36 positioned to provide a 12" x 12" box. The upper platen 38 was lowered upon stops which spaced the upper platen 38 two inches from the conveyor 32. The platens were heated to 350° F. to cause the resin to foam and fill the interstitial voids. The final product weighed 575.5 grams and had an equivalent density of 7.6 pounds per cubic foot.

The foamable resin mix was made by blending a mix A and a mix B immediately before application to the pellets. Mix A and mix B had the following compositions:

Mix A

| | Grams |
|---|---|
| Resin A of Pat. 2,979,469 (refrigerated) | 250.0 |
| Tween 40 (polyoxyethylene sorbitan monopalmitate) | 12.5 |
| Diatomaceous earth | 13.0 |
| Diazoaminobenzene | 14.3 |
| Methanol | 15.0 |
| Benzene | 10.0 |

Mix B

| | Grams |
|---|---|
| Urea | 12.5 |
| 37% HCl (refrigerated) | 38.7 |

The finished phenolic foamed glass foamed composite had the structure shown in FIG. 9 wherein the glass pellets were in engagement with each other along the three major mutually perpendicular planes of the composite.

EXAMPLE 3

The procedure of Example 2 was repeated using a foamable powdered novolac resin mixture instead of the foamable resole resin of Example 2. A composite was made by spreading 65 grams of a foamable novolac powder, later to be described, on the bottom of the apparatus shown in FIGS. 5 and 6, and then pouring 515 grams of the same pellets used in Example 2 on top of the powder. The platen 38 was heated and lowered as in Example 2 and was held in its lower position for approximately 10 minutes. The pellets were in engagement with each other along the three major perpendicular planes of the composite and the voids between were thoroughly filled with the resulting novolac foam. The composite weighed 575 grams and had a density of 7.6 pounds per cubic foot. The foamable novolac powder was made by mixing: 77 parts by weight of the dehydrated molten resin described in Example 1 of Pat. 2,993,871; 16 parts by weight of hexamethylene tetramine; 4 parts of silicone A,³ and 4 parts of dinitroso pentamethylenetetramine. The molten mixture was cooled and solidified and ground to 40 mesh.

EXAMPLE 4

The novolac resin of Example 3 was dissolved in methyl alcohol to provide a 70 percent by weight solution. A liquid novolac foamable resin was prepared by mixing the following: 110 parts by weight of the above liquid resin, 16 parts by weight of hexamethylene tetramine, 4 parts by weight of the silicone of Example 3, 4 parts by weight of dinitroso pentamethylene-tetramine, 30 parts by weight of methanol. A 12" x 12" x 2" sample was prepared using the apparatus shown in FIGS. 5 and 6 by coating 556 grams of pellets having a nominal ⅛ inch diameter, a true density of 11.3 pounds per cubic foot, and a bulk density of 7.345 pounds per cubic foot, with 151 grams of the above foamable liquid mix. The coated pellets were placed in the apparatus of FIGS. 5 and 6 as described in the preceding example, the platens were heated to 350° F. and the sample di-electric cured using 1.5 amps of electricity for 90 seconds. The finished composite weighed 629 grams and had a density of 8.3 pounds per cubic foot.

Other types of thermosetting and thermoplastic organic foams can be used as the binder material.

EXAMPLE 5

A polyurethane glass foam composite was made by pouring 89 grams of a urethane foamable mixture, later to be described, on top of 402 grams of ¼ inch nominal glass foam pellets having a true density of 8.72 pounds per cubic foot and an apparent density of 5.32 pounds per cubic foot in a mold heated to 130° F. The mold was closed so that the sides of the mold cavity were in engagement with the pellets, and the mold was thereafter heated in an oven at 175° F. for 25 minutes. The finished sample weighed 489 grams had a density of 8.5 pounds per cubic foot, and was roughly 12" x 12" x 2".

The polyurethane foamable mix was made by blending 2.85 pounds of a polyphenyl methyl isocyanate sold under the trade name Carwin's PAPI resin, with 4.095 pounds of chlorendic anhydride base polyester resin sold under the trade name Hooker's 250 resin, and which contains a catalyst, surfactant, the same silicone indicated above, and

---

³ Silicone A has the following formula:

$$CH_3-\underset{\underset{CH_3}{|}}{\overset{\overset{CH_3}{|}}{Si}}(OSi-)_x(OC_2H_4)_y(OC_3H_6)_z(OC_4H_9)_3$$

where $3x=6.2$, $3y=18$ and $3z=14$.

0.819 pound of Freon. The polyester was dissolved in the Freon and this mixture was then blended with the polyphenyl methyl isocyanate.

EXAMPLE 6

A Styrofoam glass foam pellet composite is made by placing 394 grams of ¼ inch nominal diameter glass foam pellets having a true density of 8.6 pounds per cubic foot and a bulk density of 5.2 pounds per cubic foot in a mold all sides of which rest against the glass pellets. The voids between the glass pellets are filled with a polystyrene foam having a density of approximately 3 pounds per cubic foot by forcing the foamed polystyrene of Example 1 of McCurdy et al. Pat. 2,669,751 into the mold in the manner indicated by the patent. The finished composite weighs approximately 485 grams and has a density of 6.4 pounds per cubic foot.

Inorganic foamed materials can also be forced into the interstitial voids between glass foamed pellets to produce similar results.

EXAMPLE 7

Following the teachings of U.S. Pat. 3,147,128, a slurry was prepared containing 29.8 percent MgO, 13 percent by weight of magnesium sulfate, 0.5 percent by weight of magnesium chloride, and 0.8 percent by weight of Airfoam, a surfactant sold by American Le France-Foamite Corporation. 394 grams of ¼ inch nominal diameter glass foam pellets having a true density of 8.6 pounds per cubic foot, and a bulk density of 5.2 pounds per cubic foot where mixed with 1500 grams of the above described foamed slurry which was mechanically foamed by intermixing with air. The mixture was placed in a mold whose sides confined the material into a shape approximately 12" x 12" x 2" and which was heated to 150° F. One side of the mold had a number of small holes therein through which excess cement could escape to insure that the pellets engaged each other on the three major perpendicular planes of the molded articles. The cement was allowed to set for one hour, and was removed from the mold, and dried overnight in an oven at 180° F. The dried sample weighed 573 grams and had a density of 7.6 pounds per cubic foot.

All of the Examples 2–7 provided structures wherein the pellets engaged each other on three mutually perpendicular planes and each of the composites are capable of standing high compressive loads in each of the three mutually perpendicular directions. Materials of the type shown in FIG. 11 can be produced using any of the foamed or foamable materials described in Examples 2–6 by using the apparatus shown in FIG. 10. Where the glass pellets are mixed with a prefoamed material, the converging portion 64 of the conveyor squeezes the foam laterally to bring some of the glass foam pellets into engagement with each other. Foam caught behind pellets that are squeezed together, thereafter causes aligned pellets to be moved laterally so that some orientation of the type shown in FIG. 11 is produced. The induction heating elements and cooling coils may or may not be used depending on the type of binder being processed with the glass foam pellets. When a foamable material is used as a binder, it will function in the same manner as partially foamed polystyrene beads described above, and will produce generally the same type of structure shown in FIG. 11 as does polystyrene previously described.

A further beneficial effect is achieved by the structures of the present invention in that an unexpectedly low coefficient of thermal conductivity is retained. By using a sulfate salt as the blowing agent of the glass, foamed glass pellets are produced containing sulfur dioxide gases. These sulfur dioxide gases have very low coefficient of heat transfer. Upon standing, however, glass pellets lose sulfur dioxide through diffusion and convection, so that conventional glass material containing sulfur dioxide cannot be depended upon to retain this low coefficient of heat transfer. What is more, sulfur dioxide is corrosive, particularly in the presence of water, so that conventional glass materials containing sulfur dioxide are not accepted commercially. In the structures of the present invention, however, each of the foamed glass pellets is surrounded by a matrix of foamed polystyrene which produces a skin on the surfaces of the foamed glass beads to prevent convection current from displacing the sulfur dioxide. Any sulfur dioxide which escapes from the glass beads is absorbed and is held by the foam material, particularly upon cooling when the gases used to form the foam contract and absorb $SO_2$. This causes the foam to have a lower K value than it normally would have. The K value of the composite, therefore, is extremely low, and what is more, the composite is an acceptable commercial material.

The amount of foamable organic resin as for example, polystyrene beads, used to produce a given degree of expansion, will, of course, vary with the weight of the organic resin and the degree to which it can be satisfactorily expanded. Since the interstitial voids between the structures shown in FIG. 9 varies from approximately 10 to 40% when the pellets are approximately ¼ inch to ½ inch in diameter, and since the weight of most organic foams is less than half that of the glass pellets, the percent by weight of most foamable resins for producing the structure of FIG. 9 will vary from between approximately 5 and approximately 20%. The weight of the foamed organic material can be increased, however, by confining the organic material during its expansion.

In order to produce a separation of the layers of pellets shown in FIG. 11, a greater quantity of the foamable organic resin will be necessary, and the foamable organic resin will in most instances be more than approximately 20% by weight of the total composition. The pellets can be moved by the foaming organic resin by a distance approximately equal to their diameter without producing separation of the pellets within the layers, and when the layers of pellets are so spaced, the organic foam may comprise up to approximately 70% by weight of the total material.

It will be apparent that various changes and modifications can be made from the specific details set forth and shown in the attached drawings without departing from the spirit and scope of the invention as defined in the appended claims.

I claim:
1. A body of foam having high compressive strength along at least one of its major axes, comprising:
    glass foam pellets arranged in abutting, pellet to pellet, touching engagement along at least one major axis of said body;
    said pellets touching but not fused to one another; and
    a matrix of a foamed binder filling the interstices formed by and between said touching glass foam pellets.
2. The body of foam of claim 1 wherein said matrix comprises foamed polystyrene beads fused together.
3. The body of foam of claim 1 wherein said matrix comprises a foam of an inorganic cement.
4. The body of claim 3 wherein the foam is a foam of magnesium oxysulfate.
5. The body of foam of claim 1 wherein the matrix is a foam of a phenolic resin.
6. The body of foam of claim 1 wherein said matrix comprises foamed polyurethane.
7. The body of foam of claim 1 wherein said matrix comprises foamed polystyrene.
8. A body of foam having high compressive strength along at least one of its major axes, comprising:
    columns of glass foam pellets arranged in abutting, pellet to pellet, touching engagement along at least one major axis of said body;
    said pellets touching but not fused to one another; and
    a matrix of a foamed binder filling the interstices formed by and between said columns of touching glass foam pellets.

References Cited

UNITED STATES PATENTS

| | | | |
|---|---|---|---|
| 3,056,184 | 10/1962 | Blaha | 161—168 X |
| 3,321,414 | 5/1967 | Uieli | 161—168 X |
| 3,325,341 | 6/1967 | Shannon | 161—159 X |
| 2,806,509 | 9/1957 | Bozzacco et al. | 161—Dig. 5 |
| 3,015,604 | 1/1962 | Hochberg | 161—Dig. 5 |
| 2,978,340 | 4/1961 | Veatch et al. | 106—40 |
| 3,046,172 | 7/1962 | Reid | 161—160 |
| 3,086,898 | 4/1963 | Alford et al. | 161—Dig. 5 |
| 3,484,391 | 12/1969 | Wheatley et al. | 252—62 X |
| 3,510,323 | 5/1970 | Wismer et al. | 252—62 X |

HAROLD ANSHER, Primary Examiner

U.S. Cl. X.R.

161—159, Dig. 5; 252—62